United States Patent [19]

Durno

[11] 4,421,287
[45] Dec. 20, 1983

[54] HELICOPTER CYCLIC STICK MIDPOSITION FEEL INDICATOR

[75] Inventor: Ronald A. Durno, Trumbull, Conn.

[73] Assignee: United Technologies Corporation, Hartford, Conn.

[21] Appl. No.: 322,105

[22] Filed: Nov. 16, 1981

[51] Int. Cl.³ .................. B64C 13/08; B64C 29/02
[52] U.S. Cl. .................................. 244/223; 74/532; 70/199; 244/224
[58] Field of Search ............. 244/1 R, 17.11, 223, 244/224; 70/199, 202, 209, 210, 211; 74/532

[56] References Cited

U.S. PATENT DOCUMENTS

| | | |
|---|---|---|
| 1,338,131 | 4/1920 | Hendricks . |
| 1,361,061 | 12/1920 | Hyland .................................. 74/532 |
| 1,379,522 | 5/1921 | Bruner ............................. 244/17.11 |
| 1,423,955 | 7/1922 | Miller . |
| 1,440,823 | 1/1923 | Fenlon . |
| 2,111,804 | 3/1938 | Page ................................... 244/224 |
| 2,967,681 | 1/1961 | Berquist . |
| 4,324,151 | 4/1982 | Rudy ..................................... 70/199 |

*Primary Examiner*—Charles E. Frankfort
*Attorney, Agent, or Firm*—Vernon F. Hauschild

[57] ABSTRACT

To provide the pilot with the "feel" that he is inadvertently moving his cyclic control stick from its midposition when the helicopter is on the ground, and thereby possibly changing the rotor plane from a safe to an unsafe position for ground personnel, a restraint member is provided which includes an over-center spring, and which may be pivoted from its stowed position into an operable position where it bears against the cyclic stick so midpositioned. The over-center spring thereof offers resistance to cyclic stick motion if the pilot inadvertently begins to move the stick forward or laterally of its midposition, but the spring biasing force can readily be overcome by the pilot by manually pushing the cyclic stick forward and thereby cause the restraint member to move to its stowed position.

2 Claims, 4 Drawing Figures

HELICOPTER CYCLIC STICK MIDPOSITION FEEL INDICATOR

TECHNICAL FIELD

This invention relates to mechanism for preventing a helicopter pilot from inadvertently moving his cyclic control stick forward of its midposition when the helicopter is on the ground and the rotor is idling, so that the rotor plane is not thereby inadvertently moved from a safe position to an unsafe position for ground personnel. If the cyclic stick were moved forward of midposition, the rotor plane would tilt forward such that the blade tips sweep close to the ground forward of the nose of the helicopter. This inadvertent tilting of the rotor plane is prevented by a cyclic stick position indicator which bears against the cyclic stick so midpositioned and is spring biased so that if the pilot inadvertently moves the cyclic stick forward of midposition, he "feels" the force of the spring bias and, hence, is aware that he is moving the cyclic stick forward of the midposition. Further, in response to substantial forward motion of the cyclic stick by the pilot, the spring biased midposition "feel" indicator is automatically moved to its stowed position.

BACKGROUND ART

In the helicopter art, and in other fields, apparatus has been provided to retain the cyclic stick, or other control rod, in its midposition during ground operation. However, all such prior art permanently lacks the cyclic stick fixedly in the midposition and the lock has to be removed before the cyclic stick can be moved from its midposition. In this prior art, the cyclic stick cannot be moved from its midposition by merely having the pilot manually override the restraint means. Examples of this prior art are Berquist U.S. Pat. No. 2,967,681, Miller U.S. Pat. No. 1,423,955, Fenlon U.S. Pat. No. 144,823 and Hendrick U.S. Pat. No. 1,338,131. This prior art accordingly has neither position "feel" nor override capability.

DISCLOSURE OF INVENTION

A primary object of the present invention is to provide an indication by sense of "feel", to a helicopter pilot when the helicopter is in stationary, ground operation that he is inadvertently moving the cyclic stick out of its midposition. The "feel" position indicator taught herein resists inadvertent forward movement of the cyclic stick out of its midposition, to thereby provide the pilot with a sense of "feel" that he is advertently moving the cyclic stick forward of its ground safe midposition and thereby causing the rotor plane to tilt from a substantially horizontal position to a forward tilt position in which the blad tips sweep close to the ground and could thereby endanger the ground personnel.

It is an important feature of this invention that the "feel" position indicator may be stowed in a position in which it is sufficiently clear of the cyclic stick that the cyclic stick may be moved without interference throughout its full motion pattern during normal helicopter operation, and so that the "feel" indicator may intentionally be moved by the pilot from the stowed position into a second position to bear against the cyclic stick when in its midposition during stationary ground operation.

It is another important feature of this invention that the cyclic stick "feel" position indicator may be overriden by the pilot when the pilot intentionally pushes the cyclic stick forward of its midposition and, further, such that the stick position indicator will automatically return to its stowed position when the pilot overcomes the biasing spring resistance thereof in so pushing the cyclic stick forward of its midposition.

It is a further feature of this invention that the cyclic stick "feel" position indicator is readily accessible to the pilot, and fully visible to the pilot at all times.

BEST MODE FOR CARRYING OUT THE INVENTION

Figure 1:
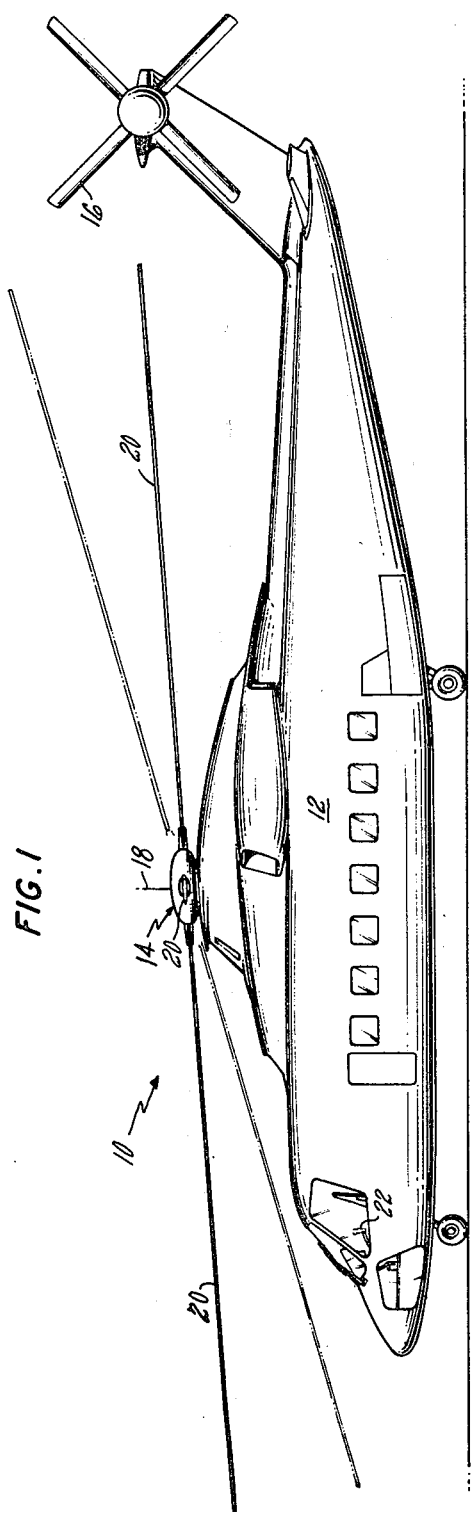
FIG. 1 is a showing of a helicopter in stationary ground operation and with the helicopter rotor plane shown in a substantially horizontal position in fixed lines, and with the rotor plane shown in a forward tilt position in phantom lines.

Referring to FIG. 1, we helicopter 10 in ground operating position in which the helicopter 10 may be stopped or moving. Helicopter 10 comprises fuselage 12 and main rotor 14, as well as tail rotor 16. In conventional fashion, main rotor 14 is supported from fuselage 12 to be rotatable about axis of rotation 18. A plurality of helicopter blades 20 rotate as part of main rotor 14 to define a rotor plane of rotation. The pilot controlled cyclic stick is used to control the position of the rotor plane. With the cyclic stick in its midposition, the rotor plane is in the substantially horizontal position shown in solid lines in FIG. 1. The solid line rotor plane is substantially parallel to the ground so that ground personnel and passengers may pass thereunder in safety. When the cyclic stick is moved forward from its midposition, the rotor plane goes to a forward tilt position shown in phantom in FIG. 1. It will be seen that the phantom rotor plane sweeps close to the ground and therefore would endanger any ground personnel or passengers in that area.

It is accordingly important, when the helicopter is operating stationary on the ground, but with main rotor 14 idling, that the helicopter cyclic stick remain in its midposition so as to keep the helicopter rotor 14 in its FIG. 1 solid-line horizonal plane position. To ensure this, we provide mechanism to make the pilot aware if he should inadvertently begin to move the stick forward of its midposition, but which mechaism is capable of being overriden if the pilot intentionally pushes the cyclic stick forward of its midposition, possibly to cause the helicopter to taxi along the ground.

Figure 2:
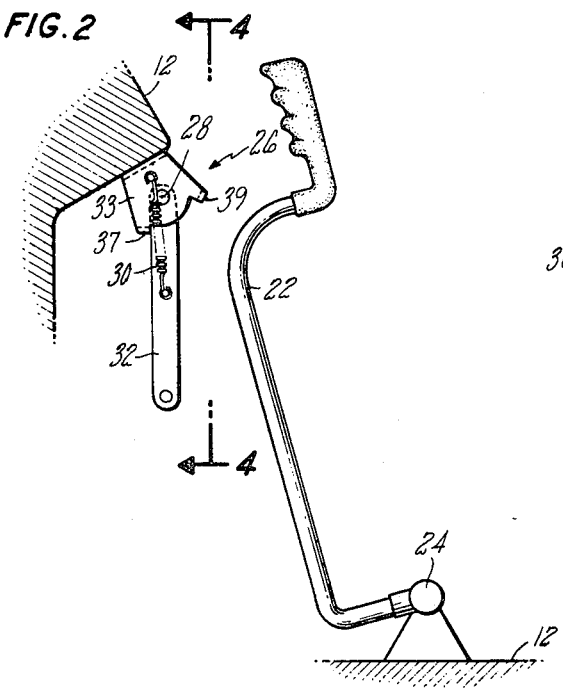
FIG. 2 is a showing of the cyclic stick "feel" position indicator in its retracted position in relation to the fully operative cyclic stick.

As best shown in FIG. 2, helicopter cyclic stick 22 is supported from fuselage 12 for universal motion about universal joint 24.

Figure 3:
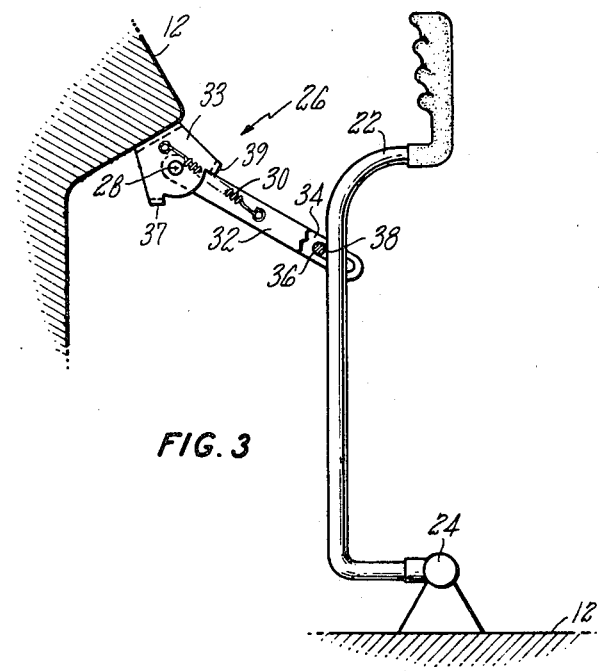
FIG. 3 is a showing of the cyclic stick "feel" position indicator in its operable position bearing against the midpositioned cyclic stick.

FIG. 3 shows cyclic stick 22 in its midposition, which cyclic stick position would be the desirable position if the helicopter is on the ground in stationary mode and with the main rotor 14 idling since this would place the rotor plane in the horizontal position shown in solid lines in FIG. 1. In conventional fashion, cyclic stick 22 motion causes cyclic variation of the pitch of the rotor blades 20. Stick 22 is operably connected to the rotor blades 20 such that when the cyclic stick is pushed forward of its midposition to its FIG. 2 position, the rotor plane will tilt forward to its FIG. 1 phantom position. If the cyclic stick were to be moved to starboard, the rotor plane would tilt in that direction, and if the cyclic stick were to be moved to port, the rotor plane would tilt in that direction.

Still referring to FIGS. 2 and 3, we see that cyclic stick position "feel" indicator 26 is supported by support 33 from fuselage 12, possibly from an instrument panel, for pivot motion about pivot axis 28 between its FIG. 2 stowed position and its FIG. 3 armed or operable position. It should be noted that when in its FIG. 2 stowed position, the indicator 26 is sufficiently removed from cyclic stick 22 that the cyclic stick may be moved throughout its full control operating pattern. "Feel" indicator 26 is basically a toggle member which the pilot may grip and pivot from its FIG. 2 stowed position to its FIG. 3 operable position. The pilot would so move indicator 26 when the helicopter is in stationary ground operation mode with the helicopter rotor 14 idling. When the cyclic stick 22 is in its FIG. 3 midposition, the rotor plane is in its horizontal position. "Feel" indicator 26 bears against cyclic stick 22 so positioned as shown in FIG. 3. Indicator 26 includes over-center spring 30, which, in the FIG. 3 position, serves to bias indicator 26 against the cyclic stick 22. With the indicator 26 in its FIG. 2 stowed position, spring 30 similarly biases "feel" position indicator 26 in its stowed position.

The biasing force of over-center spring 30, when in the FIG. 3 operable position, performs the very important function of resisting movement of "feel" position indicator 26 from its FIG. 3 position. Accordingly, if the pilot should inadvertently commence to move cyclic stick 22 forward of its FIG. 3 midposition, the force of biasing spring 30 would have to be overcome to be able to so move cyclic stick forward of it midposition, and, therefore, the pilot would experience a resistance, or a "feel" through this resistance, that he is moving the cyclic stick forward of its midposition. The force of biasing spring 30 is selected so that, while it provides this all-important "feel" to the pilot that he is moving his cyclic stick forward of his midposition when this movement is inadvertent, the force of spring 30 is such that it can be readily, intentionally overcome by the pilot if he wishes to intentionally, manually push the cyclic stick 22 forward of its midposition, possibly to cause the helicopter to move forward on the ground. When the pilot intentionally moves cyclic stick forward from its FIG. 3 midposition, the biasing force of spring 30 is overcome and pivotable "feel" position 26 automatically moves from its FIG. 3 operable position to its FIG. 2 stowed position due to the motion imparted thereto by cyclic stick 22 and also due to the biasing force imparted thereby by over-center spring 30.

It will accordingly be noted that, while position indicator 26 serves to provide resistance to motion of cyclic stick from its FIG. 3 midposition, resistance can be readily overcome by the pilot as he overrides position indicator 26 in manually pushing cyclic stick 22 forward and thereby causing position indicator 26 to pivot to its retracted FIG. 2 position.

Figure 4:
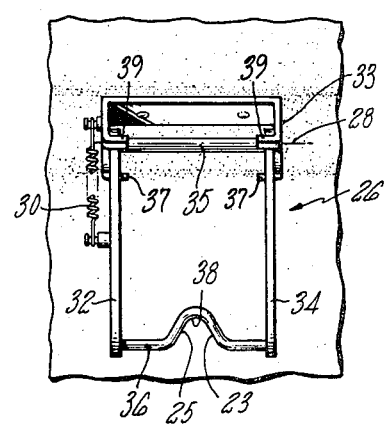
FIG. 4 is a showing of the cyclic stick "feel" position indicator when viewed along line 4—4 of FIG. 2.

Now referring to FIG. 4, we see "feel" position indicator 26 in greater particularity. Position indicator 26 is preferably a toggle member mounted for pivot motion about axis 28. It comprises parallel side arms 32 and 34, which are pivotally connected to support 33 by bar 35, and span member 36 extending therebetween. Span member 36 is shaped so as to have recess 38 therein. Recess 38 opens in a rearward direction when "feel" position indicator 26 is in its FIG. 3 operable position and is selectively shaped so as to engage cyclic stick 22. Indicator 26 operates to offer the biasing force of over-center spring 30 as resistance and hence "feel" to the pilot when the pilot attempts to move cyclic stick 22 forward from its FIG. 3 midposition. Indicator 26 operates similarly to provide resistance and hence pilot "feel" when the pilot attempts to move cyclic stick either laterally starboard or laterally port from its FIG. 3 position. This resistance to lateral cyclic stick movement is experienced because, as best shown in FIG. 4, if the pilot moves cyclic stick 22 either laterally to starboard or port, stick 22 encounters angular surfaces 23 or 25, respectively, of recess 38, and thereby causes position indicator to pivot forward against the force of biasing spring 30 and thereby produce the desired "feel" to the pilot that he is moving stick 22 forward of its safe midposition.

Spring 30 serves to bias arms 32 and 34 against positive stops 37 when in the FIG. 2 position, and against positive stops 39 when in the FIG. 3 position.

Accordingly, when helicopter 10 is operating in stationary position on the ground and the pilot wants the rotor plane to come to its horizontal position shown in solid lines in FIG. 1, he moves cyclic stick 22 to its FIG. 3 midposition. To assure against inadvertent movement of cyclic stick 22 from its FIG. 3 midposition, the pilot manually moves "feel" positioner 26 from its FIG. 2 stowed position into its FIG. 3 operable position where it bears against cyclic stick 22 and is operable to offer resistance should the pilot inadvertently try to move cyclic stick forward or laterally from that midposition. If the pilot intends to move cyclic stick 22 from that position, position indicator 26 can be manually overridden by the pilot and will automatically retract to its stowed FIG. 2 position in response to forward or lateral motion of cyclic stick 22 from its FIG. 3 midposition.

We wish it to be understood that we do not desire to be limited to the exact details of construction shown and described, for obvious modifications will occur to a person skilled in the art.

I claim:
1. A helicopter having:
   a fuselage;
   a multi-bladed rotor mounted for rotation from said fuselage about an axis of rotation and comprising:
      a plurality of variable pitch helicopter blades mounted to rotate as part of said rotor to establish the rotor plane and responsive to cyclic pitch change to selectively tilt the rotor plane to various positions including a horizontal position in which the rotor plane is substantially parallel to the ground when the helicopter is on the ground, and a forward tilt plane position in which the blades sweep close to the ground;
   a cyclic control stick operatively connected to vary blade pitch cyclically and mounted for universal motion about a fixed point in said fuselage and having a midposition which causes the rotor plane to be in said horizontal position;
   a cyclic stick "feel" position indicator comprising an over-center toggle means pivotally supported in the fuselage so as to be manually pivotable between a first position in which the "feel" position indica- tor is clear of the cyclic stick sufficiently so that the cyclic stick can be moved without interference throughout its entire motion pattern, and a second position in which the "feel" indicator abuts the cyclic stick when the cyclic stick is in its midposition, such that the cyclic stick is continuously free for only intentional pilot imposed universal motion about said fixed point, said "feel" position indicator having a biasing spring operatively connected to bias the toggle means in each of its first and second positions and being of selected spring rate so that if the pilot inadvertently attempts to move the cyclic stick forward of its midposition when the feel indicator is abutting the cyclic stick, he "feels" the resisting force of the biasing spring, but the spring rate of the biasing spring permits the pilot to overpower that resisting force and move the cyclic stick forward and, hence, cause the rotor to move from its horizontal position to its forward tilt plane position by manually applying sufficient force to the cyclic stick, and further so that pilot imposed motion of the cyclic stick forward of its midposition by a predetermined amount with said "feel" position indicator in its second position, will automatically cause said indicator to move to its first position due to the force applied thereto by the biasing spring member.

2. A helicopter according to claim 1 wherein said toggle means is shaped to define a recess which opens in the rearward direction and into which said cyclic stick is received when said cyclic stick is in said midposition and said restraining means is in said second position, so that the pilot "feels" the resulting force of the biasing spring when he attempts to move the cyclic stick either forward or laterally.

* * * * *

UNITED STATES PATENT AND TRADEMARK OFFICE
CERTIFICATE OF CORRECTION

PATENT NO. : 4,421,287

DATED : December 20, 1983

INVENTOR(S) : Ronald A. Durno

It is certified that error appears in the above-identified patent and that said Letters Patent is hereby corrected as shown below:

| | | |
|---|---|---|
| Col. 1, | Line 31 | "lacks" should read --locks-- |
| | Line 51 | "advertently" should read --inadvertently-- |
| | Line 55 | "blad" should read --blade-- |
| Col. 2, | Line 28 | After "we", insert the word --see-- |
| | Line 56 | "mechaism" should read --mechanism-- |
| Col. 3, | Line 53 | "position" should read --positioner-- |
| | Line 57 | "thereby" should read --thereto-- |
| Col. 6, | Line 15 | "resulting" should read --resisting-- |

Signed and Sealed this

Twenty-third Day of April 1985

[SEAL]

Attest:

DONALD J. QUIGG

Attesting Officer     Acting Commissioner of Patents and Trademarks